US005293695A

United States Patent [19]
Olshefsky

[11] Patent Number: 5,293,695
[45] Date of Patent: Mar. 15, 1994

[54] TOOL FOR MEASURING RELATIVE DISTANCE BETWEEN TWO ADJACENT SURFACES AND METHOD THEREFOR

[75] Inventor: Frank A. Olshefsky, Schenectady, N.Y.

[73] Assignee: Equipment Development Services, Schenectady, N.Y.

[21] Appl. No.: 922,792

[22] Filed: Jul. 31, 1992

[51] Int. Cl.⁵ .............................................. G01B 5/14
[52] U.S. Cl. .................. 33/783; 33/501.04; 33/542
[58] Field of Search ............... 33/542, 543, 544, 550, 33/553–555, 657, 655, 783, 501.02, 501.03, 501.04, 656, 827, 710

[56] References Cited

U.S. PATENT DOCUMENTS

| | | | |
|---|---|---|---|
| 2,134,262 | 10/1938 | Phillips | 33/797 |
| 3,418,720 | 12/1968 | Worthen | 33/797 |
| 3,780,442 | 12/1973 | Gresho | 33/542 |
| 3,789,511 | 2/1974 | Groom et al. | |
| 4,045,877 | 9/1977 | Rutter | 33/542 |
| 4,087,918 | 5/1978 | Schmid et al. | |
| 4,142,296 | 3/1979 | Miller | |
| 4,190,961 | 3/1980 | James et al. | |
| 4,395,827 | 8/1983 | Stowe et al. | 33/655 |
| 4,419,830 | 12/1983 | Miller | |
| 4,694,585 | 9/1987 | Frizot et al. | |
| 5,063,687 | 11/1991 | Olshefsky | |

FOREIGN PATENT DOCUMENTS 718539 11/1954 United Kingdom ................. 33/827

*Primary Examiner*—Thomas B. Will
*Attorney, Agent, or Firm*—Pollock, Vande Sande & Priddy

[57] ABSTRACT

The present invention instrument measures the differential distances between two adjacent surfaces. To accomplish this end, the instrument has a main body to which there is pivotally coupled a U frame whose arms extend at an angle from its base, so that as the former is pivoted in one direction, the latter will correspondingly pivot in an opposite direction. Contact points are provided to the arms and the bottom surface of the body, and the base of the U frame is biased by a spring loaded slidable element within the body which in turn is connected to a transducer. Thus, as the instrument is moved between two adjacent surfaces, the lower and upper contacts having previously been adjusted to maintain contact with the respective lower and upper surfaces, any deviation in the space between the two being measured adjacent surfaces would cause the U frame to pivotally move. Such pivotal movement by the U frame is translated to the slidable element, and converted by the transducer into a corresponding electrical signal. A user can thus quickly ascertain from a readout of the signal any relative spatial differences between the two being measured adjacent surfaces. Also, by using known calibration standards, the present invention can be used to measure absolute dimensions as well as differential distances.

11 Claims, 5 Drawing Sheets

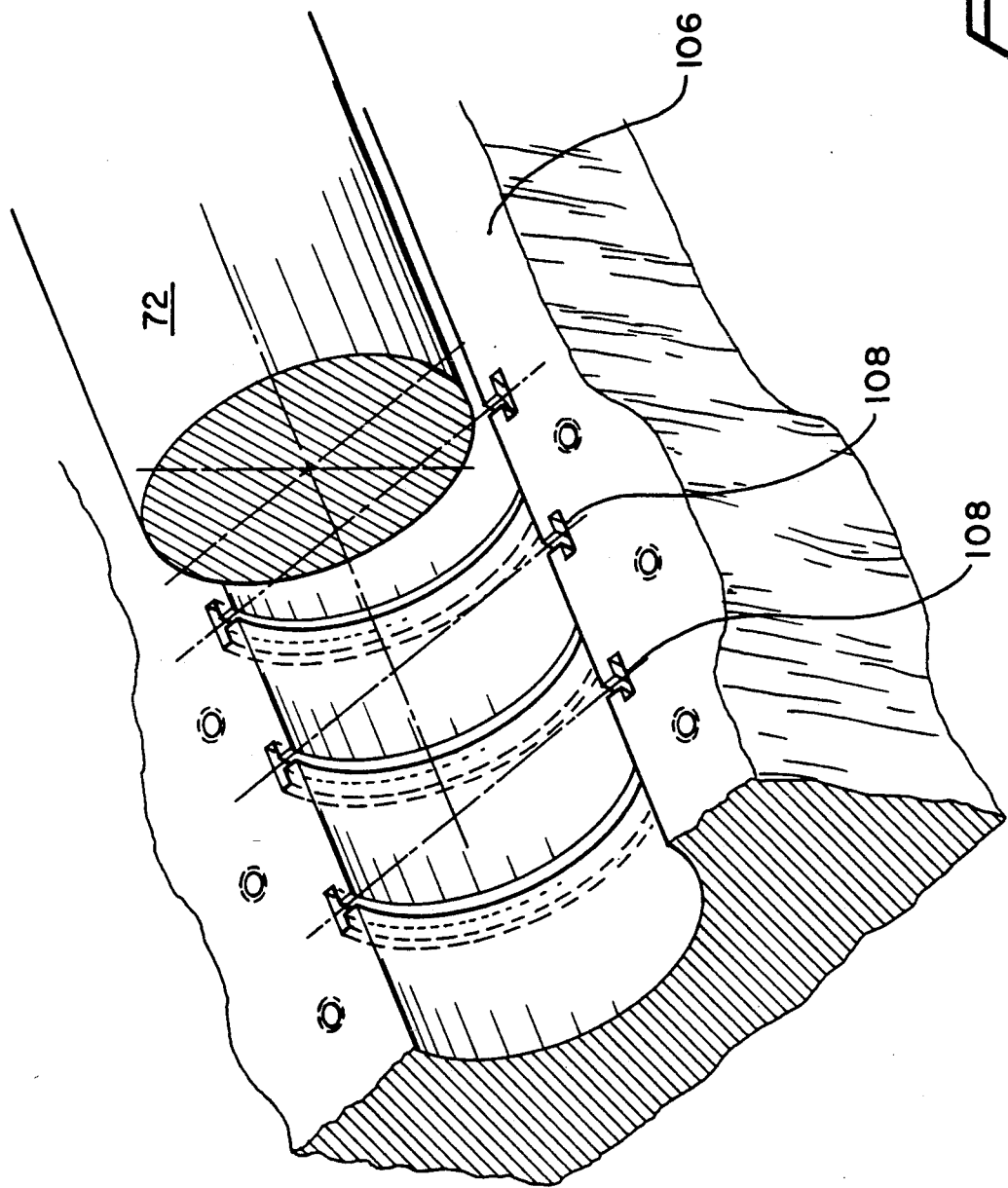

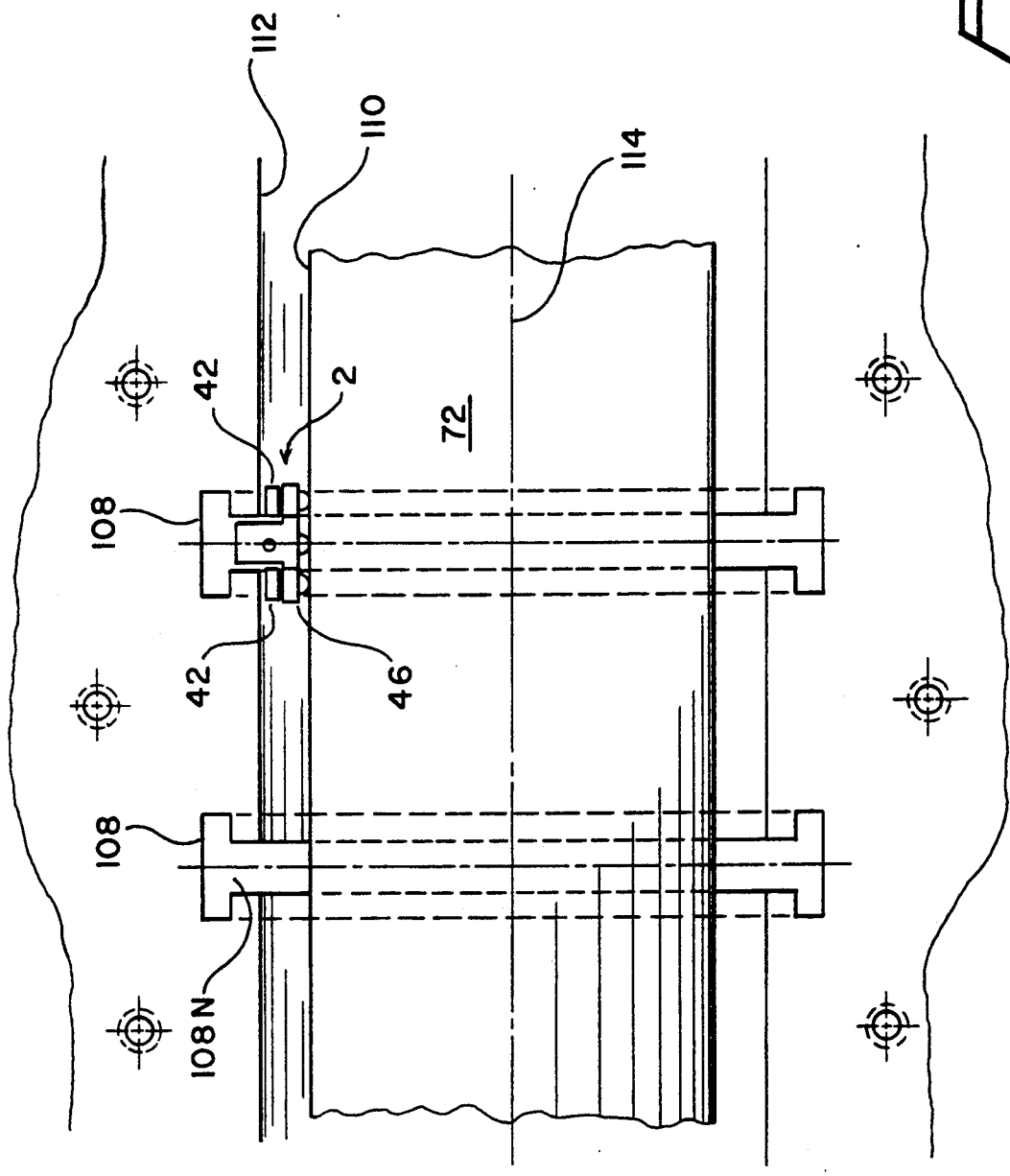

TOOL FOR MEASURING RELATIVE DISTANCE BETWEEN TWO ADJACENT SURFACES AND METHOD THEREFOR

FIELD OF THE INVENTION

The present invention relates to measuring instruments and more particularly to an instrument that is specifically suited for measuring the relative distance(s) between adjacent surfaces, and/or the concentricity between two surfaces, as for example the outer circumferential surface of a shaft and the corresponding inner circumferential surface of a stator housing in a turbine.

BRIEF DESCRIPTION OF THE PRIOR ART

For a turbine to operate efficiently, during its assembly or overhaul, it is required that its rotor be concentric with the stator. This is because between each row of the turbine blades, a packing gland has to be carefully positioned to prevent steam from escaping. The packing gland consists of a labyrinth seal generally made of brass or copper and has a number of teeth that protrude from the stator housing which enter into grooves cut into the rotor shaft. The packing gland is fitted to the stator and held in place with a so-called "T" slot construction. To operate, it is essential that the packing gland be concentric to the grooves in the rotor.

One of the prior art devices used to measure concentricity between the rotor shaft and the inner bore of a stator is disclosed in James et al. U.S. Pat. No. 4,190,961. There, a device that includes a number of test probes each mounted on a metal block are inserted into the gap between the stator and the rotor. Each of the probes is a non-contact inductive proximity eddy probe. The probes are spaced along the circumference of the gap, and a corresponding number of outputs provide a number of readouts. The packing housing is then aligned by adjusting the spacing between the rotor and the stator housing until each of the readouts from the probes is the same.

Other known prior art tools for measuring concentricity between the rotor shaft and stator of a turbine include so-called Electronic Radial Alignment Gauges I and II (ERAG) used by the General Electric Company. Each of the ERAGs, in principal, has a vertically slidable sensor assembly whose sensor is forced against the being measured upper surface. The sensor assembly, being of open construction, is susceptible to contamination from dirt falling thereinto, as well as damage caused by contact with the part that is being measured. Further, the ERAGs each are made of a large number of components and tend to be bulky. Furthermore, once adjusted, the transducer in the ERAGs cannot be further zero readjusted so that each readout has to take into account the earlier adjusted zero value.

BRIEF DESCRIPTION OF THE PRESENT INVENTION

The present invention is an alignment device having a construction which overcomes the limitations of prior art tools. Although disclosed with reference to measuring concentricity, it should be appreciated that the present invention tool is also capable of measuring relative distances between two adjacent surfaces, even in instances where the surfaces are non-circular.

Specifically, as constructed, the present invention distance variation measurement tool has a main body configured to have a dimension acceptable for insertion into the "T" slot of a turbine. On the bottom side of the body are coupled a number of finger-like extensions that maintain constant contact with one of the surfaces, as for example the outer circumference of the rotor shaft. An U-shaped frame is pivotally coupled, via its extension arms, to a front portion of the body so that the base of the U-shaped frame is pivotable about the front portion of the body, while the extending arms are pivotable vertically along the respective sides of the body. Thus, as the base portion of the U-shaped frame rotationally moves, the extending arms would move upwards and downwards. Bolted to the end portion of the extending arms are contact members.

Threadedly mated to the base portion of the U-shaped frame is an adjustment screw whose engagement can be varied to maintain a constant contact with a plunger that is slidably fitted within a hollow portion of the body. The plunger is spring biased such that it constantly is forced towards the adjustment screw threaded to the base portion of the U-shape frame, to thereby provide a constant biasing for the same. Attached to the end portion of the plunger that is not in contact with the threaded screw is a ferromagnetic core that is slidable within a linear variable differential transformer (LVDT), also fitted within the hollow portion of the body.

By varying the engagement of the threaded screw, the extending arms of the U-shape frame can be adjusted so that they will continuously bias against the other surface of the adjacent surfaces, as for example the inner circumferential surface of the stator housing. As the body is moved between the adjacent surfaces, any relative difference in distance between the surfaces would cause the extending arms of the U-shaped frame to move pivotally, thereby causing the plunger to induce the LVDT to output a continuous representative output signal. Inasmuch as the height of the contact members bolted to the extending arms of the U-shaped frame can be adjusted, for example by spacers, adjacent surfaces having different spatial distances are accommodated by the instant invention measuring tool. Further, insofar as the null position of the output reading from the LVDT can be adjusted, easier readings result.

It is therefore an objective of the present invention to provide a measuring instrument that can readily measure the relative differences between two adjacent surfaces.

It is another objective of the present invention to provide a concentricity measuring instrument that is compact, with few moving parts, and whose output can easily be read.

BRIEF DESCRIPTION OF THE DRAWINGS

The above mentioned objectives and advantages of the present invention will become more apparent and the invention itself will be best understood by reference to the following description of an embodiment of the invention taken in conjunction with the accompanying drawings, wherein:

FIG. 6 is a perspective view of a conventional turbine having its upper stator housing removed to illustrate the use of the present invention instrument in such setting; and FIG. 7 is a top view of the FIG. 6 turbine for illustrating an exemplar operation of the present invention instrument.

DETAILED DESCRIPTION OF THE PRESENT INVENTION

Figure 1:
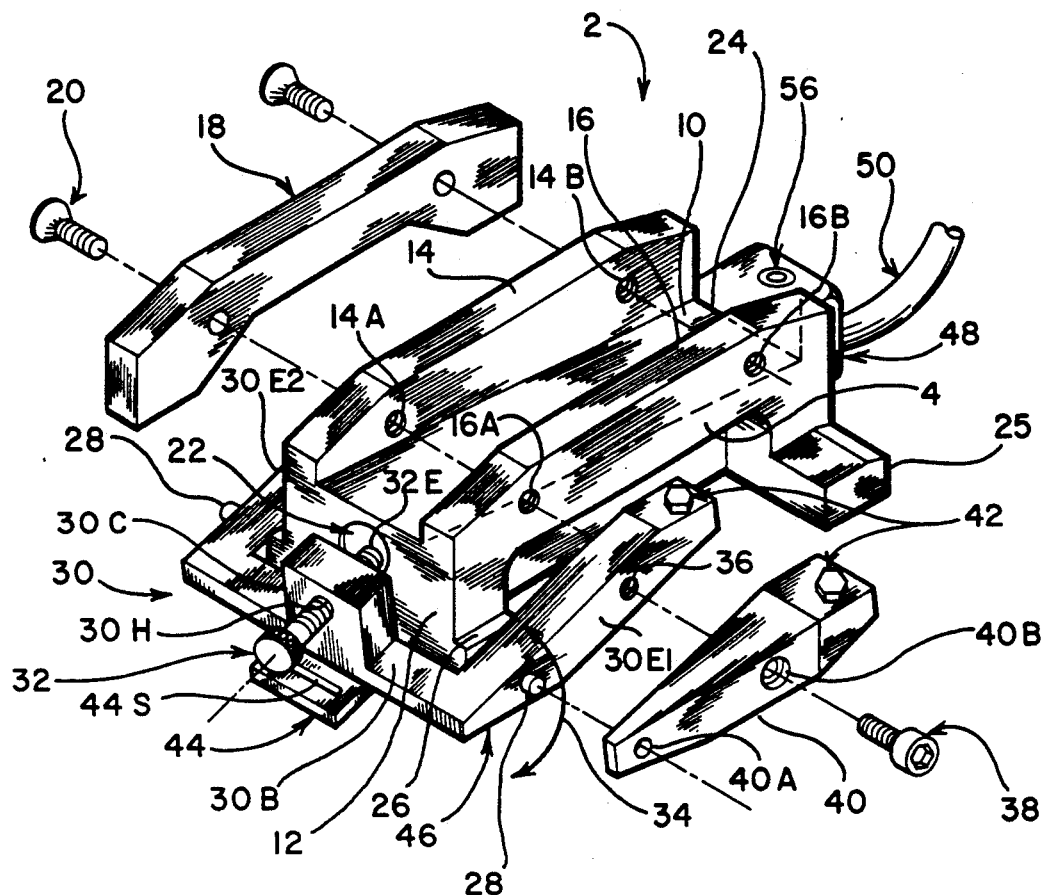
FIG. 1 is a perspective view of the present invention instrument.

With reference to FIG. 1, a perspective view of the present invention instrument for measuring the relative distance between two adjacent surfaces, or the variations of the distance between the surfaces, is shown. For the remainder of this discussion, for the sake of simplicity, the present invention tool is to be referred to as a concentricity alignment tool (CAT), albeit it should be appreciated that the invention CAT is certainly capable of measuring relative distances between two adjacent surfaces, be those surfaces circular or flat. In other words, in addition to measuring the concentricity of rotor shafts and stator housings etc., the present invention CAT can also measure any variation of distance between two surfaces when such is required, as for example to precisely align parallel surfaces.

As shown, CAT 2 has a main body portion 4, which in turn has a bottom portion 6 (more clearly shown in FIG. 2), a top portion 8 (shown in FIG. 3), a rear portion 10, and a front portion 12. For the embodiment shown in FIG. 1, body 4 has two raised portions 14, 16 extending from its respective longitudinal sides. Along each of extensions 14 and 16 are two threaded holes (14a, 24b, 16a, 16b) which are for accepting an expanding part such as 18 via screws 20. Although only a single part 18 is shown to be mated to extension portion 14, it should be appreciated that a similar part could also be mated to extension 16 via holes 16a and 16b.

Figure 4:
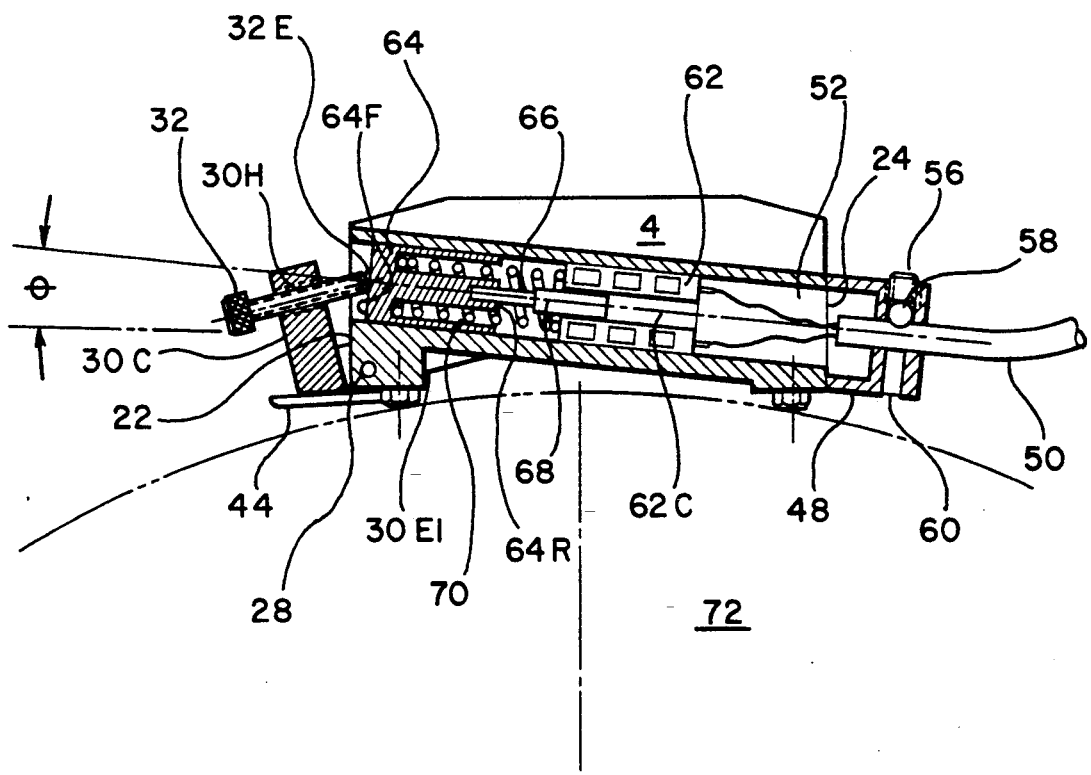
FIG. 4 is a cross-section view of the FIG. 1 instrument as shown via sectional line A—A of the FIG. 3 top view.

The central part of body 4 is substantially rectangular in shape and is hollowed out (see FIG. 4). Corresponding openings are provided at the front and rear portions of body 4, i.e. front opening 22 and rear opening 24. As more clearly shown in the bottom plan view of FIG. 2, body 4 has a first supporting member 25 at its aft section and supporting member 26 at its forward section. A U-shaped frame 30 (U frame) is pivotally coupled to body 4 via respective sides of support section 26, by means of a pivot rod 28 (or separate rods 28) at the respective sides of extension 26.

As shown, U frame 30 has a base member 30b and two extension arms 30e1 and 30e2. Base member 30b has a central extension portion 30c which has a centrally threaded hole 30h. An adjusting screw 32 is threadedly mated to extension portion 30c through hole 30h, which is in alignment with hole 22 of body 4 such that screw 32 can be adjusted to position its end portion 32e into hole 22.

Each of arms 30e1 and 30e2 has a lower hole through which pivot rod 28 is inserted and about which arms 30e1 and 30e2 rotate. As arms 30e1 and 30e2 each are set at an angle relative to base member 30b, as member 30b is pivoted downwards, arms 30e1 and 30e2 would pivot upwards per indicated by bidirectional arrows 34. Conversely, as member 30b is pivoted upwards, arms 30e1 and 30e2 would pivot downwards.

Further integrated to each of arms 30e1 and 30e2 (shown only in 30e1 in FIG. 1) is a hole 36 to which a screw 38 may be mated for coupling an extender arm 40. Holes 40a and 40b are provided in extender arm 40 in alignment with pivot pin 28 and hole 36 of arm 30e1, so that a secure fit is ensured between extender arm 40 and arm 30e1. Mounted on an upper flat portion of arm 30e1, and a corresponding flat portion of extender arm 40, are contact heads 42, which may be bolts. As is the case with expanding part 18, the use of extender arm 40 is not required for the practice of the instant invention CAT. The need for extender arm 40 and side expanding part 18 will be discussed later in relation to the operation of the CAT.

A plate 44, although shown to be below flat bottom portion 36 of U frame 30, in actuality, is coupled to body 4 via a bolt 46. See also FIG. 2. Plate 44 has a slot 44s to which attachment to the CAT may be effected, as for example by a tape, for pulling CAT 2 along the being measured surfaces. An additional function of plate 44 is to prevent base member 30b of U frame 30 from pivoting too far downwards.

Figure 2:
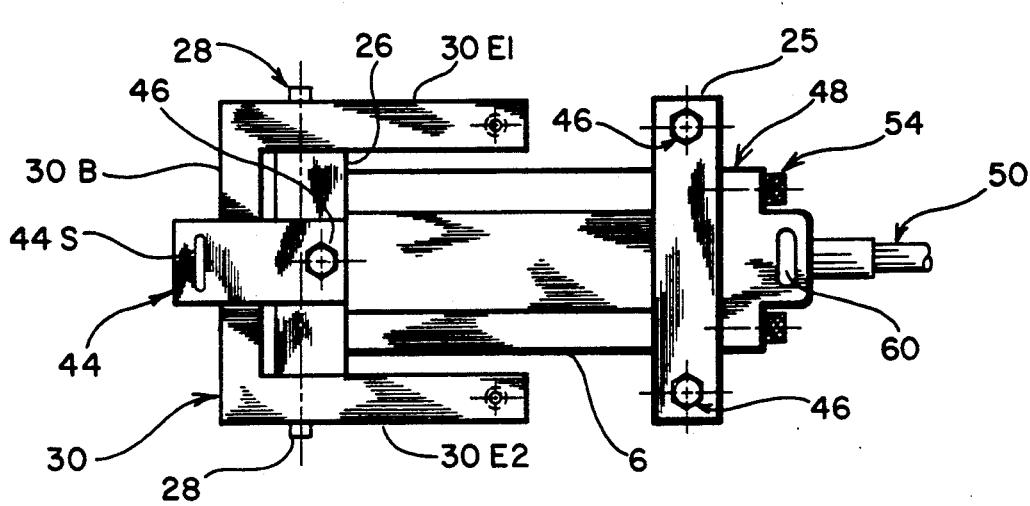
FIG. 2 is a bottom view of the FIG. 1 instrument.
Figure 3:
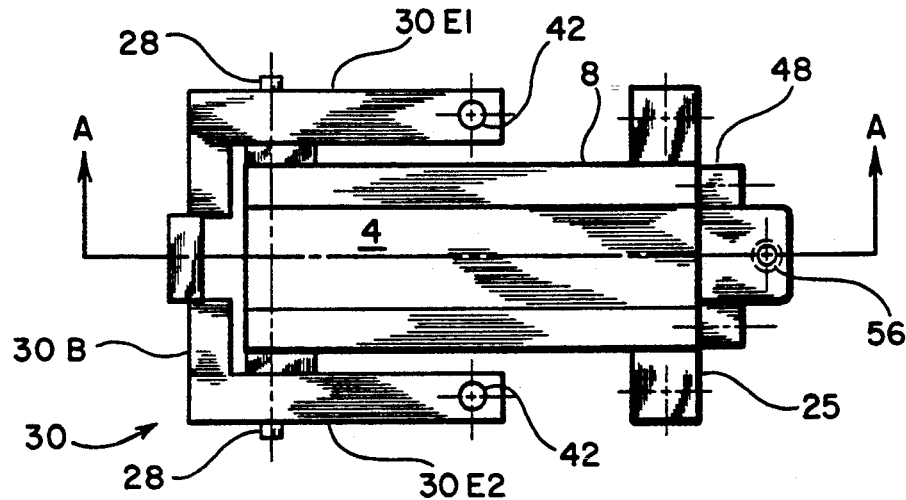
FIG. 3 is a top view of the FIG. 1 instrument.

With reference to FIG. 2, it can be seen that mounted to the bottom of support member 4 and the bottom of the forward section of body 4 are a number of lower contact fingers 46, which for example may be bolts threaded to corresponding holes. Further shown in FIGS. 1 and 2 is a cable clamping block 48 whose purpose is to clamp cable 50, which is provided to the chamber, designated 52, within body 4. See FIG. 4. Block 48 is coupled to an end portion 10 of body 4 at an end face including opening 24 by bolts 54. (FIG. 2). It should be appreciated that bolts 54 could be threaded into block 48 so that no portion of them are shown.

With specific reference to FIGS. 1 and 4, it can be seen that cable 50 is secured at block 48 by a screw 56 acting on a ball bearing 58 against a slot 60. By forcing steel ball bearing 58 against cable 50 so that the latter is pushed into slot 60, cable 50 is securely gripped without having its internal wires damaged.

With reference to FIG. 4, a cross-sectional view of body 4, together with the internal components fitted within chamber 52, are shown. As illustrated, fitted within chamber 52 is a linear variable differential transformer (LVDT) 62, connected electrically to the circuit schematically shown in FIG. 5 by cable 50. Also situated within chamber 52, and in front of LVDT 62, is a slidable element, in the form of a plunger 64 having a front end 64f and a rear end 64r, to which a first end of a rod 66 is attached. To the other end of rod 66 is attached the ferromagnetic core 68 of LVDT 62 which is slidable within cavity 62c of LVDT 62. Plunger 64 in turn is biased by a compression spring 70 such that it is continuously pushed toward opening 22 of body 4. As is well known to one skilled in the art, ferromagnetic element 68, as it slides within cavity 62c of LVDT 62, induces LVDT 62 to produce different electrical signals, which are carried by cable 50 to a reading device such as the meter shown in FIG. 5 and converted to corresponding readable outputs.

Inasmuch as plunger 64 is continuously pushed towards opening 22 and U frame 30 is pivotable about point 28, screw 32 can be adjusted so that its tip 32e would remain in constant contact with front portion 64f of plunger 64. To prevent plunger 64 from exiting chamber 52 through opening 22, screw 32 is adjusted to a sufficient length relative to U frame extension 30c such that base portion 30b of U frame 30 is prevented by plate 44 from pivoting downwards beyond that point. In other words, plate 44 provides for a positive stop for U frame 30. Thus, as U frame 30 pivots about a point at pivot pin 28, any movement thereof is translated by adjustable screw to plunger 64 and in turn to ferromagnetic element 68, and converted by LVDT 62 into a corresponding electrical signal.

As shown in FIG. 4, it should be appreciated that chamber 52 is aligned at an angle, designated $\phi$, so that the axis of LVDT 62 is at an angle to the base. This allows cable 50 to exit chamber 52 closer to the shaft, for example shaft 72 on which CAT 2 is shown to be resting on, to result in a more tangential pulling force when cable 50 is used to pull CAT 2 through the space between shaft 72 and a stator housing.

Figure 5:
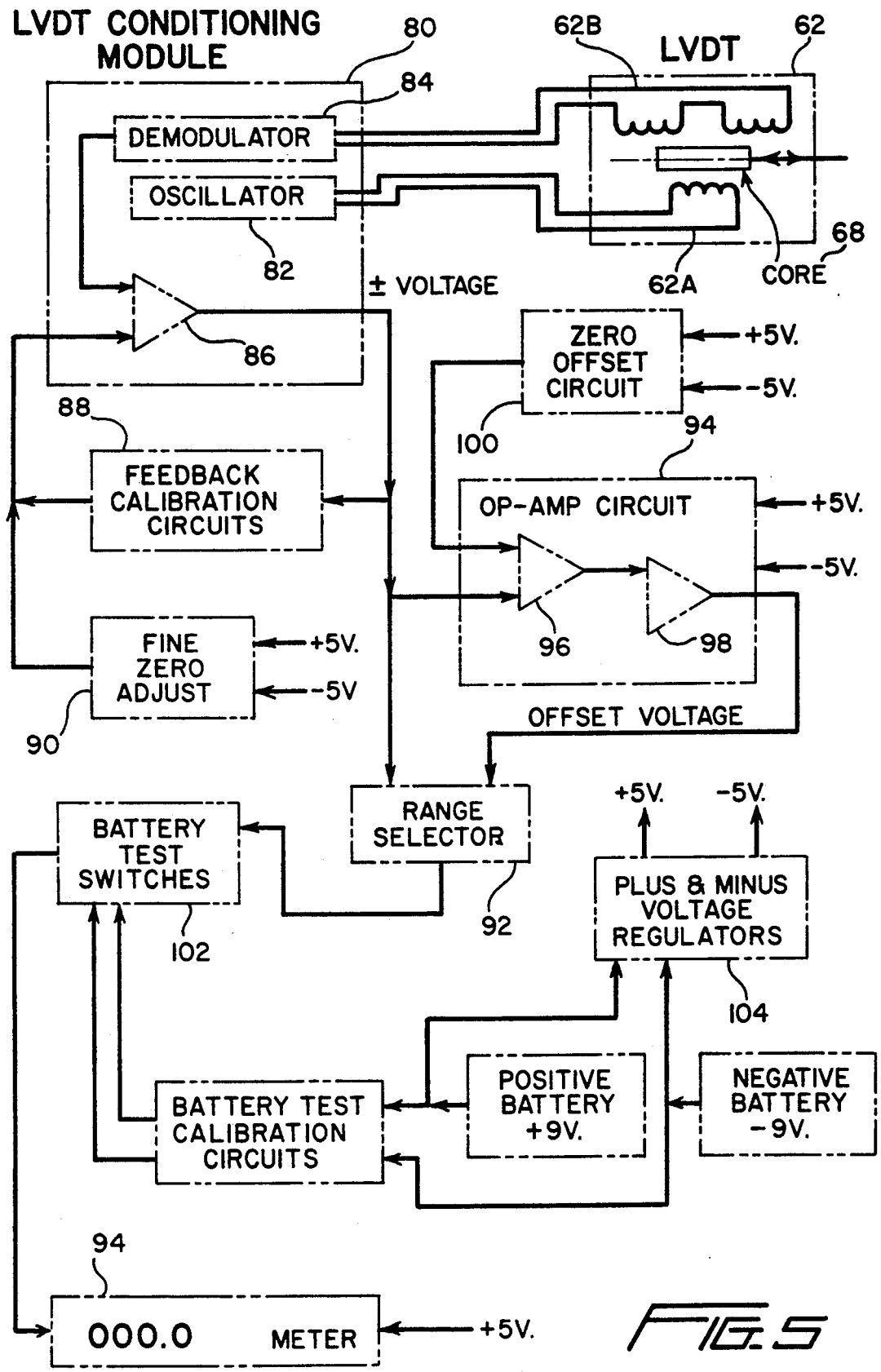
FIG. 5 is a schematic of the circuit used in conjunction with the present instrument for powering and obtaining output readings from the same.

The electrical schematic diagram of the power supply module for providing power to LVDT 62 and for converting its outputs into corresponding readable formats is shown in FIG. 5. The construction of a LVDT and the operation thereof are well known and are discussed, for example, in Olshefsky U.S. Pat. No. 5,063,687, the pertinent portion of which as it relates to a LVDT is incorporated by reference herein.

As shown, LVDT 62 is connected to a LVDT conditioning module 80 which comprises a Signetics NE 5521 Chip. As is well known, LVDT 62 has a first coil 62a connected to an oscillator 82 in module 80. Oscillator 82 of course is used to excite coil 62 by providing an excitation frequency thereto. Also within LVDT 62 is a second coil 62b which is connected to a demodulator 84 within module 80. As core 68 is moved relative to windings 62a and 62b, an electromagnetic force EMF is induced and fed to demodulator 84. There, the AC signal is converted into a DC signal, which is output to an op-amp 86.

Connected to another input of op-amp 86 is an output provided by feedback calibration circuits 88 which is adjustable by a fine zero adjustment circuit 90, i.e. a voltage divider network. Thus, the voltage at the output of op-amp 86 is either a plus or minus voltage. This voltage is next provided to a range selector circuit 92. Also connected as an input to range selector circuit 92 is an output provided by op-amp circuits 94 in the form of an off-set voltage from LVDT 62. Op-amp circuits 94 comprise a first op-amp 96, which acts as a summer, and a second op-amp 98, which acts as an inverter circuit. For zero off-set, a zero off-set circuit 100 (a voltage divider circuit) is provided as an output to op-amp 96. Thus, by summing the plus/minus voltage provided from op-amp 86 and the zero off-set voltage from circuit 100, an off-set voltage, in the correct polarity, is provided to range selector 92.

As its name implies, range selector enables an operator to select either the plus/minus voltage or the off-set voltage for meter 94. Battery test switches 102 are incorporated into the circuit to enable the user to test the integrity of the batteries, powering the FIG. 5 circuit. The voltage from the batteries are controlled by voltage regulators 104.

With the FIG. 5 circuit, a plus or minus reading about a zero point, or a positive reading from a zero point (or a negative reading from a zero point) could all be obtained. This flexibility is important in that it allows the present invention CAT to provide a reading based on a zero point, in both negative and positive directions. It should further be realized that the FIG. 5 circuit, in addition to being usable by the present invention CAT, can also accommodate other instrument utilizing LVDTs, as for example the earlier mentioned instrument disclosed in the '687 patent.

The operation of the present invention CAT is discussed hereinbelow with reference to FIGS. 6 and 7. FIG. 6 shows in perspective a conventional turbine section whose upper stator housing has been removed. Do note that turbine blades and turbine stationary diaphragms are not shown for the sake of clarity. As shown, the rotor (or the turbine shaft) 72 is positioned within the stator housing 106. For efficient operation, shaft 72 must be positioned concentrically relative to the inner circumferential surface of stator housing 106. As is well known, there are a plurality of "T" slots, such as 108, in stator housing 106. Packing rings are fitted within T slots 108 when the turbine is in operation.

To test concentricity of shaft 72 relative to stator 106, the upper half of the stator housing is removed. The packing rings are also removed from T slots 108. Thereafter, a tape (or other pulling means) with a end portion that is adapted to fit into slot 44s of CAT 2 (FIG. 1) is fished around a T slot from one of the open ends to the other. The tape is then fitted to slot 44s of CAT 2, and CAT 2 is inserted into the being used T slot 108. Of course, depending on the space between adjacent surfaces 110 and 112 (110 being the outer circumferential surface of shaft 72 and 112 being the inner circumferential surface of the stator housing), the height of contact heads 42 (FIG. 1) can be adjusted by, for example the insertion of spacers underneath the heads. Also, adjustment can be made by adjusting screw 32 so that the pivotal movement of U frame 30 is adjusted to fit within the spaced defined by surfaces 110 and 112. Extending portions 14 and 16 of body 4, inasmuch as those portions extend somewhat into the narrow portion of T slot 108, act as guides for CAT, as it is being drawn into, and through, T slot 108. In instances where the narrow portion of T slot 108 is wider than body 4, expanding parts 18 are added to portions 14 and 16 of body 4 to provide better fitting. Likewise, if it is deemed that arms 30e1 and 30e2 are too narrow for the width of the T slot, extender arms 40 may be added thereto.

As shown in FIG. 7, as long as lower fingers 46 maintain contact with surface 110 and heads 42 maintain contact with surface 112, if shaft 72 and stator housing 106 are not concentric with reference to axis 114, assuming that the FIG. 5 circuit has been adjusted to a zero reading for perfect concentricity, either a negative or positive reading will be provided by meters 94 to indicate to the user that shaft 72 has to be realigned relative to stator housing 106. Such alignment procedures are well known and will not be discussed herein.

Thus, by providing a continuous reading, as plunger 64 is continuously biased against pivotable U frame 30 via adjustable screw 32, a continuous indication of concentricity is provided. Of course, to determine concentricity for the length of the turbine, the present invention CAT is inserted into each of the T slots 108 to test the concentricity of the shaft and the stator housing relative to the being tested T slot.

As was mentioned previously, the present invention CAT, in addition to its being used to test the concentricity of a turbine shaft relative to its stator housing, is also adaptable to be used to test the relative distance(s) separating two adjacent surfaces, be they circular or otherwise. Thus, inasmuch as the present invention is subject to many variations, modifications and changes in detail, it is intended that all matters throughout this specification and shown in the accompanying drawings be interpreted as illustrative only and not in a limiting sense. Accordingly, it is intended that the invention be limited only by the spirit and scope of the appended claims.

I claim:

1. Apparatus to ascertain the relative distance between two adjacent surfaces, comprising:
   first means movable along and maintaining constant contact with at least two points on one of said surfaces;
   second means movable in concert with and pivoting relative to said first means to bias against the other of said surfaces, said second means movable along and maintaining constant contact with at least two points on said other surface;
   means responsive to said second means for converting any vertical movement thereof relative to said first means as a relative distance between said two adjacent surfaces.

2. Apparatus of claim 1, further comprising:
   a body to which said first and second means are coupled;
   wherein said first means comprises a plurality of fingers extending substantially perpendicularly away from said body, at least two of said fingers maintaining constant contact with said two points on said one surface; and
   wherein said second means comprises at least one member having at least two contact means pivotally coupled to and extending away from said body in a direction opposite to that of said fingers to contact said at least two points on said other surface.

3. Apparatus of claim 2, wherein said second means further comprises adjustable means biased against said responsive means; and
   wherein said responsive means comprises a transducer means and a slidable element whose motion reflects that of said member and whose movement is converted by said transducer means to indicate said relative distance between said surfaces.

4. Apparatus of claim 3, wherein said second means comprises a frame pivotally coupled to said body and having a base portion to which said member is integrated so as to move in a direction opposite to the movement of said base portion; and
   wherein said adjustable means comprises a screw threadedly mated to said base portion to be in continuous contact with said slidable element.

5. A tool for measuring radial distance variations between two adjacent surfaces, comprising:
   a body movable between said surfaces;
   contact means attached to one side of said body to maintain constant contact with at least two points on one of said surfaces;
   frame means movably coupled and pivotable relative to said body, said frame means including at least two extensions biased against the other of said surfaces;
   transducer means responsive to pivotal movements of said frame means relative to said body, as said body is moved between said surfaces, for converting said movements to corresponding radial distance variations.

6. Tool of claim 5, wherein said frame means comprises an U-shaped frame having a base member and respective arms extending from corresponding ends thereof, said two extensions each being attached to a corresponding one of said respective arms, said frame being movably coupled to said body such that said base member is positioned in front of a forward portion of said body, said tool further comprising:
   an adjustable extender means coupled to said base member; and
   wherein said transducer means comprises an element spring biased against said extender means for maintaining constant contact thereto to force said base member away from said forward portion of said body to thereby pivotally bias said arms to contact said other surface.

7. Tool of claim 6, wherein said transducer means further comprises a linear variable differential transformer (LVDT) for converting physical movements of said arms to corresponding electrical signals.

8. Apparatus to measure concentricity between upper and lower surfaces, comprising:
   a body having an upper portion and a lower portion;
   a plurality of lower fingers coupled to said lower portion of said body to be in continuous contact with said lower surface;
   a frame movably pivotally coupled to said body and movable about said upper and lower portions, said frame having attached thereto at least one upper finger movable in a direction opposite to the movement direction of said frame;
   an element slidably fitted within said body and pushing against said frame to continually pivotally bias said upper finger against said upper surface; and
   transducer means responsive to the movement of said slidable element for measuring pivotal movements translated by said upper finger to said slidable element as said body is moved between said surfaces to thereby measure the concentricity between said upper and lower surfaces.

9. Apparatus of claim 8, further comprising:
   an adjustable element threadedly mated to said frame to be contiguous with one end of said slidable element, the reach of said upper finger for insuring that it is in continuous contact with said upper surface being adjustable by threading said adjustable element relative to said frame.

10. Apparatus of claim 8, wherein said transducer means comprises a LVDT for converting the pivotal movements of said upper finger to corresponding electrical signals.

11. A method of measuring the relative distance between two adjacent surfaces, comprising the steps of:
   (a) positioning a body having a first contact means having at least two contact points, a second contact means having at least another two contact points and a transducer means between said surfaces;
   (b) maintaining said first contact means in constant contact via said two contact points with one of said surfaces;
   (c) maintaining said second contact means via said another two contact points in constant contact with the other of said surfaces by pivoting said second contact means relative to said first contact means to bias said second contact means against said transducer means; and
   (d) utilizing said transducer means to convert any pivotal movement of said second contact means, as said body is sandwichedly moved along said adjacent surfaces, to a corresponding relative distance between said surfaces.

* * * * *